(No Model.)
F. W. WOHLFERT.
SEPARABLE SQUARE.
No. 485,402. Patented Nov. 1, 1892.
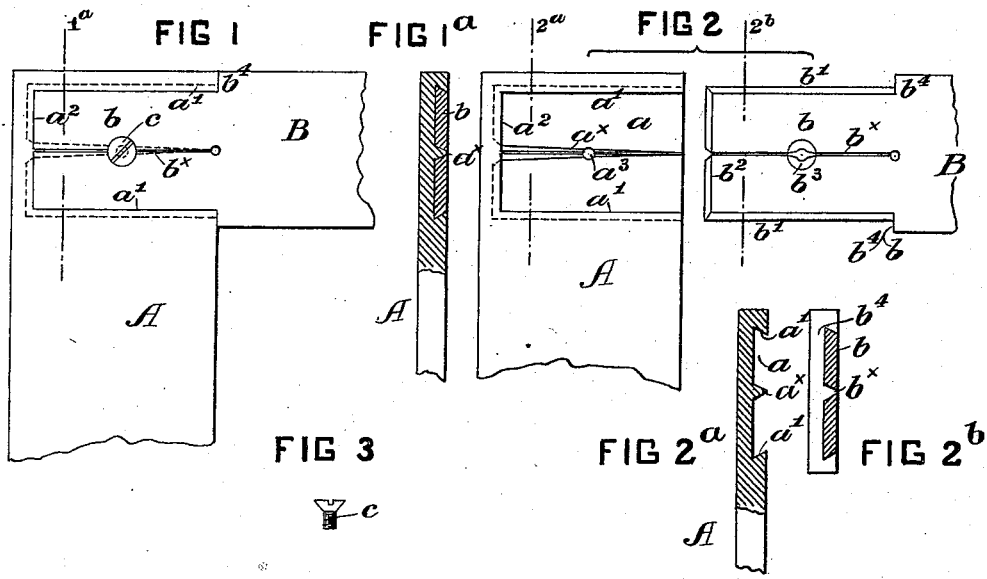
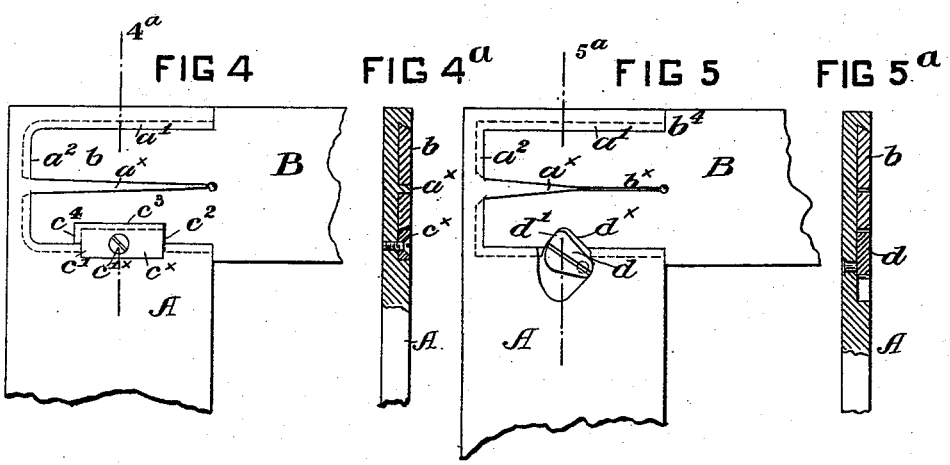
WITNESSES:
INVENTOR:
Frederick W. Wohlfert,
By Henry Bonnet
Attorney.

UNITED STATES PATENT OFFICE.

FREDERICK W. WOHLFERT, OF NEW YORK, N. Y.

SEPARABLE SQUARE.

SPECIFICATION forming part of Letters Patent No. 485,402, dated November 1, 1892.

Application filed March 3, 1892. Serial No. 423,664. (No model.)

*To all whom it may concern:*

Be it known that I, FREDERICK W. WOHLFERT, a citizen of the United States, residing in the city, county, and State of New York, have invented certain Improvements in Separable Squares, of which the following is a specification.

My invention relates to metal squares such as are commonly used by carpenters, masons, and others, and particularly to that class of such squares having the two arms or branches made separable, so that the squares may be more compactly stored or packed for transportation; and the object of my invention is to provide a lap-joint, whereby the two arms may be fitted and secured together separably and in a readily-detachable manner, and whereby when so fitted together they will be rigid with respect to each other and a fiducial angle at their joint provided and maintained. Provision is also made for preserving the rigid character of the joint even after the halved and overlapping parts at the joint have become worn by frequent detachment of the members or branches.

In the accompanying drawings I have illustrated several forms of my invention, all, however, containing features in common.

In the drawings, Figure 1 is a view showing the angle of a square provided with my interlocking joint, and Fig. 1$^a$ is a section on line 1$^a$ in Fig. 1. Fig. 2 is a view showing the overlapping parts of the members separated, and Figs. 2$^a$ and 2$^b$ are sections on the respective lines 2$^a$ and 2$^b$ in Fig. 2. Fig. 3 is a view of the securing-screw detached. Fig. 4 is a view similar to Fig. 1, showing a modified form of the joint in which a wedging-block and screw are employed in place of the screw seen in Fig. 1; and Fig. 4$^a$ is a section on line 4$^a$ in Fig. 4. Fig. 5 is a view similar to Figs. 1 and 4, showing another modified form of the securing and tightening device; and Fig. 5$^a$ is a section on line 5$^a$ in Fig. 5.

Referring to the first six figures, A represents one branch or member of the square and B the other member. As herein shown, B represents the shorter and narrower member. In such squares these members are joined together firmly at their ends, so that they form a right angle. In the drawings only the portions of the square about the angle are shown; but they may, of course, be of the usual or any length. The metal of the square is quite thin, and it is necessary to the proper utility of the square that the members shall be flush with each other on both faces of the square at the angle, so that no shoulder will appear, hence in making the joint the overlapping parts are halved or "gained," so that when the joint is made one member will lie in the same plane as the other.

Heretofore the difficulty has been to provide a joint and fastening which will always hold the members firm and rigid and maintain a fiducial angle. I attain this end in the manner I will now describe.

In the member A a recess $a$ is formed, extending in depth about half-way through the thickness of the same and undercut around its two sides $a'$ and its end $a^2$. Parallel with the sides $a'$ of the recess and about midway of its width is formed a raised rib $a^x$, which is in the form of and is in effect a double wedge—that is to say, its base is at the end $a^2$ of the recess and its apex is at the opposite end thereof, which is open, and it also tapers upward from the bottom of the recess to the top of the rib, as seen in the cross-sections, Figs. 1$^a$ and 2$^a$. At about the center of the recess in the line of the wedge $a^x$ is a screw-hole $a^3$. On the member B is formed a tenon $b$, which is beveled at its edges $b'$ and end $b^2$ and of such dimensions as to fit into the recess $a$ by pushing it in endwise, the bevels on its margins engaging the undercut margins of the recess $a$. In the tenon $b$ is a slit $b^x$ of such form as to fit over the wedge $a^x$ when the tenon is pushed into place, and at the proper point in the tenon is a countersunk screw-hole $b^3$, adapted to register with the hole $a^3$ when the two members are fitted together. The tenon $b$ will be normally of the same dimensions as the recess $a$; but the wedge $a^x$ will be a very little wider than the slit $b^x$, whereby when the tenon is pushed into the recess until the square shoulder $b^4$ on the member B abuts snugly against the edge of the member A the wedge will force the two portions of the tenon separated by the slit against the respective sides of the recess. When the screw $c$ is inserted and screwed down into the hole $a^3$ in the member A, the head of the screw will force the split tenon down upon the wedge and also serve to spread it. Of course, being made from metal and the elements being fitted together quite perfectly, the spreading of the tenon by means of the wedge and screw in order to make the joint perfectly firm and tight will be very slight; but it is well understood that metal parts may be fitted snugly together and still be free to move on each other. Such parts may, however, be clamped tightly by a very slight movement. The screw $c$ will serve to tighten up the parts and cause the split tenon to expand into and fit the recess, even after the parts have become worn by frequent taking apart and putting together.

In Figs. 4 and 4$^a$ another form of the joint is shown. In these views the recess $a$ and tenon $b$ are the same as before described, except that the wedge $a^x$ and slit $b^x$ are wedge-shaped only longitudinally and in place of the screw $c$ a wedging-block $c^x$ is employed, which is secured in place and forced down into the recess by a screw $c'^x$. The thicker portion of the member A, adjacent to the recess $a$, and the tenon $b$ on the member B are recessed to receive the block $c^x$. This block has a square or unbeveled shoulder at $c'$, where it engages the recess in the member A, and is also square and fitted loosely at $c^2$. At its edges $c^3$ it is beveled and at its end $c^4$ it is also beveled, the corresponding walls of the recess being also beveled correspondingly. When the tenon has been pushed into the recess, the block $c^x$ is placed and the screw $c'^x$ driven in. The screw presses the block down, and the bevel at the edge $c^3$ and end $c^4$ will press the tenon $b$ both laterally and endwise simultaneously, thus tightening it and fixing it rigidly.

Figs. 5 and 5$^a$ illustrate another form of the joint, in which the recess $a$ and tenon $b$ are the same as in Fig. 4; but in lieu of the wedging-block and screw a cam $d$, rotatively mounted in a recess in the thicker part of the member A, adjacent to the tenon, is employed. This cam $d$ takes over the tenon $b$ when in operation, occupying a shallow recess $d^x$ in the tenon and bearing at $d'$ against the wall of said recess in a manner to press the tenon endwise and sidewise into its seat or recess and to draw its shoulder up firmly to the member A. By turning the cam around out of the way the tenon may be drawn out from the recess and the members separated. In Fig. 5 I have also shown the wedge $a^x$ shortened or abbreviated, but capable of expanding the split tenon at its extremity.

Having thus described my invention, I claim—

1. A square comprising two members A and B, the member A being provided with a recess $a$, undercut at its sides and end, and a wedge $a^x$ in said recess, and the member B, provided with a tenon $b$, beveled at its edges and end, and having a slit $b^x$ to engage the wedge $a^x$, and means, substantially as described, for securing the two members together when the tenon on one occupies the recess in the other.

2. A square comprising two members A and B, the member A being provided with a recess $a$, undercut at its sides and end, and a wedge $a^x$ in said recess, which is wedge-shaped or tapered both longitudinally and vertically, the member B being provided with a tenon $b$, beveled at its sides and end and having a slit $b^x$, which engages the wedge $a^x$ in the recess when the tenon occupies the recess, and a screw $c$ to hold the parts together, said screw being situated in the line of said wedge and slit, substantially as set forth.

3. A square comprising two members A and B, the member A being provided with an undercut recess $a$ to receive a tenon $b$ on the other member, the member B, provided with said tenon, which latter is slitted longitudinally and provided with a countersink in said slit to receive a conical screw-head, and the screw $c$, of the form shown, for securing the parts together and expanding said tenon.

In witness whereof I have hereunto signed my name in the presence of two subscribing witnesses.

FREDERICK W. WOHLFERT.

Witnesses:
HENRY CONNETT,
PETER A. ROSS.